US009664705B2

United States Patent
Cobb, III et al.

(10) Patent No.: US 9,664,705 B2
(45) Date of Patent: May 30, 2017

(54) SPEED SENSOR (71) Applicant: Sensata Technologies, Inc., Attleboro, MA (US)

(72) Inventors: Carleton M. Cobb, III, East Walpole, MA (US); Andrew Amatruda, Attleboro, MA (US)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 288 days.

(21) Appl. No.: 14/607,093

(22) Filed: Jan. 28, 2015

(65) Prior Publication Data
US 2015/0233959 A1    Aug. 20, 2015

Related U.S. Application Data (60) Provisional application No. 61/941,660, filed on Feb. 19, 2014.

(51) Int. Cl.
*G01P 3/481* (2006.01)
(52) U.S. Cl.
CPC .................................. *G01P 3/481* (2013.01)
(58) Field of Classification Search
CPC ........ G01P 1/026; G01P 3/481; G01D 11/245
See application file for complete search history.

(56) References Cited

U.S. PATENT DOCUMENTS

| 5,254,807 | A | 10/1993 | Pfander et al. | |
|---|---|---|---|---|
| 6,291,990 | B1 * | 9/2001 | Nakane | G01P 1/00 324/207.2 |
| 6,334,361 | B1 | 1/2002 | De Volder et al. | |
| 6,788,054 | B2 * | 9/2004 | Collins | G01D 11/245 324/174 |
| 7,233,141 | B2 * | 6/2007 | Fouquet | B29C 45/1671 324/207.25 |

(Continued)

FOREIGN PATENT DOCUMENTS

| DE | 2410630 A1 | 9/1975 |
|---|---|---|
| DE | 100 54 501 A1 | 6/2002 |

(Continued)

OTHER PUBLICATIONS

European Search Report for EP15154634.8, Jan. 5, 2016, 3 pp. 2. Partial European Search Report for EP15154634.8, Jul. 28, 2015, 3 pages.

*Primary Examiner* — Freddie Kirkland, III
(74) *Attorney, Agent, or Firm* — Adler Pollock & Sheehan P.C.; George N. Chaclas; Daniel McGrath (57) ABSTRACT

In an embodiment, a speed sensor includes a first portion, a second portion, and a third portion. The first portion includes a sensing assembly for generating a signal associated with a movement of an object external to the speed sensor. The second portion includes a wiring harness for transferring the generated signal to a device external to the speed sensor. The first portion and the second portion are joined. The third portion is over-molded over a point of the speed sensor where the first portion joins the second portion. Over-molding the third portion at the point may act to seal the point from outside contaminants. Moreover, over-molding the third portion at the point may act to strengthen the speed sensor at the point.

10 Claims, 9 Drawing Sheets

(56) References Cited

U.S. PATENT DOCUMENTS

| | | | |
|---|---|---|---|
| 7,453,262 B2* | 11/2008 | Kawasaki | G01P 1/026 |
| | | | 324/174 |
| 8,896,298 B2* | 11/2014 | Takasaki | G01D 11/245 |
| | | | 324/207.25 |
| 8,941,374 B2* | 1/2015 | Takasaki | G01P 3/487 |
| | | | 324/207.11 |
| 9,228,861 B2* | 1/2016 | Takasaki | G01D 11/245 |
| 2004/0080317 A1 | 4/2004 | Collins et al. | |
| 2004/0150390 A1 | 8/2004 | Tsuge et al. | |
| 2005/0115317 A1 | 6/2005 | Fouquet | |
| 2009/0134864 A1 | 5/2009 | Hofler et al. | |

FOREIGN PATENT DOCUMENTS

| | | |
|---|---|---|
| DE | 102009046439 A1 | 5/2011 |
| WO | 2012149909 A1 | 11/2012 |

* cited by examiner

SPEED SENSOR

RELATED APPLICATIONS

This application claims priority to and the benefit of U.S. Provisional Patent Application No. 61/941,660, filed on Feb. 19, 2014 and titled "Turbo Speed Sensor", the contents of which are incorporated by reference as though fully set forth herein.

BACKGROUND

An internal combustion engine (ICE) may include various devices that may improve an efficiency of operation of the ICE. For example, an ICE may include a turbocharger device. The turbocharger device may improve an efficiency of the ICE by forcing air into a combustion chamber associated with the ICE.

Turbocharger devices may employ various components that may force air into a combustion chamber of an ICE. For example, a turbocharger device may include a turbine wheel, a compressor wheel, and a shaft. The shaft may connect the turbine wheel with the compressor wheel such that when the turbine wheel rotates the compressor wheel rotates.

Exhaust gases produced by the ICE may be routed to the turbocharger device where they may be used to rotate the turbine wheel. As the turbine wheel rotates it causes the compressor wheel to rotate. Rotation of the compressor wheel may cause ambient air to be pulled in and compressed by the turbocharger device. The compressed air may be pumped into the ICE's combustion chamber.

A speed sensor may be used to sense a speed of a turbocharger. For example, a turbo speed sensor may be used to sense a speed at which a turbine wheel and/or compressor wheel rotates in a turbocharger. The sensed speed may be used to measure a performance of the turbocharger.

A speed sensor may be manufactured using various over-molding processes. The over-molding processes may involve using various utilizing pressures and temperatures to accommodate the over-molding. The pressures and/or temperatures used for over-molding often are selected in order to obviate damage that may occur to the speed sensor during the manufacture of the speed sensor. Using too high of a temperature and/or pressure may cause damage to the speed sensor. However, using too low of a temperature and/or pressure may not provide a good seal for the speed sensor.

BRIEF DESCRIPTION OF THE DRAWINGS

The accompanying drawings, which are incorporated in and constitute a part of this specification, illustrate one or more embodiments described herein and, together with the description, explain these embodiments. The components of the drawings are not necessarily drawn to scale, the emphasis instead being placed upon illustrating principles of the present disclosure. In the drawings.

DETAILED DESCRIPTION

Features described herein may be used, for example, in the manufacture of a speed sensors such as, turbo speed sensors. In an embodiment, a speed sensor is divided into three distinct portions. A first portion includes a sensing assembly that is over-molded with a housing. A second portion includes a wiring harness. The first portion is joined with the second portion to produce a subassembly of the speed sensor. The subassembly is over-molded with a third portion. The third portion may seal the point of the speed sensor where the first portion joins the second portion. Moreover, the third portion may act as a flange for the speed sensor to accommodate mounting the speed sensor at a fixed position.

Figure 1:
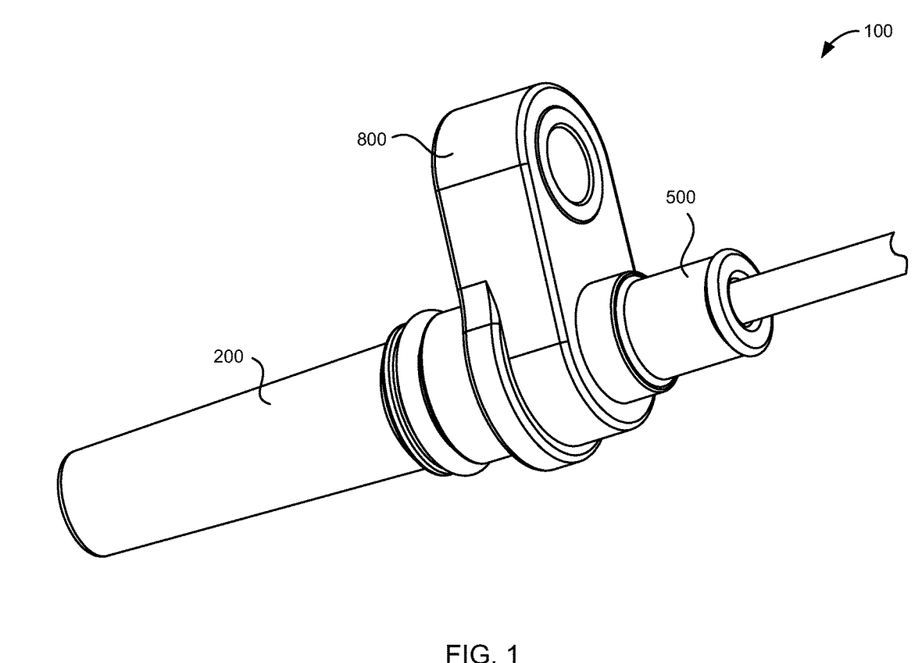
FIG. 1 illustrates an example embodiment of a speed sensor.

FIG. 1 illustrates an example embodiment of a speed sensor 100 that may implement one or more features described herein. Referring to FIG. 1, speed sensor 100 may include, for example, a first portion 200, a second portion 500, and a third portion 800.

The first portion 200 may sense a movement (e.g., rotation) of an object that is external to the speed sensor 100. The external object may be, for example, a turbine and/or compressor wheel contained in a turbocharger and the sensed movement may be a rotation of that wheel. The speed sensor may generate a signal based on the sensed movement. The generated signal may be an electrical signal such as, for example, an electrical pulse. The signal may be transferred from the first portion 200 to the second portion 500 via one or more connections that may be made between the first 200 and second 500 portions.

The second portion 500 may transfer the signal from the first portion 200 to a device that is external to the speed sensor 100. The external device may be, for example, a computer that may determine a speed associated with the external object based on the signal.

The third portion 800 may accommodate mounting the speed sensor 100. Moreover, the first portion 200 and the second portion 500 may be connected together to form a subassembly. The third portion 800 may be over-molded over the subassembly to provide a seal for the connection between the first portion 200 and the second portion 500.

As will be described further below, the first portion 200 includes a housing and a sensing assembly. The housing is over-molded over the sensing assembly and acts to protect the sensing assembly during manufacture and/or operation of the speed sensor 100. The sensing assembly includes a coil and a lead frame. The coil senses a movement of the external object and produces a signal based on the sensed movement. The lead frame, inter alia, transfers the signal to the second portion 500 via connections between the first and second portion 500.

The second portion 500 includes a housing and a wiring harness. A first end of the wiring harness connects to the first portion 200 via terminals. A second end of the harness connects to an external device. The wiring harness includes electrically conductive wires which carry the signal from the first portion 200 to an external device. The external device may identify a speed of the object based on the signal.

Moreover, the external device may control an operation of another object (e.g., a turbocharger) based on identified speed.

The first portion 200 and the second portion 500 are joined to form a subassembly. The subassembly includes an electrical connection between the first 200 and second 500 portions. The third portion 800 is over-molded over the connection made between the first 200 and second 500 portions. Here, the third portion 800 acts as a seal for the connection.

In addition, the third portion 800 contains provisions for mounting the speed sensor 100 when, for example, the speed sensor 100 is placed in operation. Here, the third portion 800 acts as a flange for the speed sensor 100.

It should be noted that breaking the speed sensor 100 into portions, such as portions 200, 500, and 800, may ease manufacturing of the speed sensor 100. For example, having the first portion 200 and the second portion 500 as separate portions may enable the first portion 200 to be manufactured without being encumbered by the wiring harness contained in the second portion 500.

Figure 2:
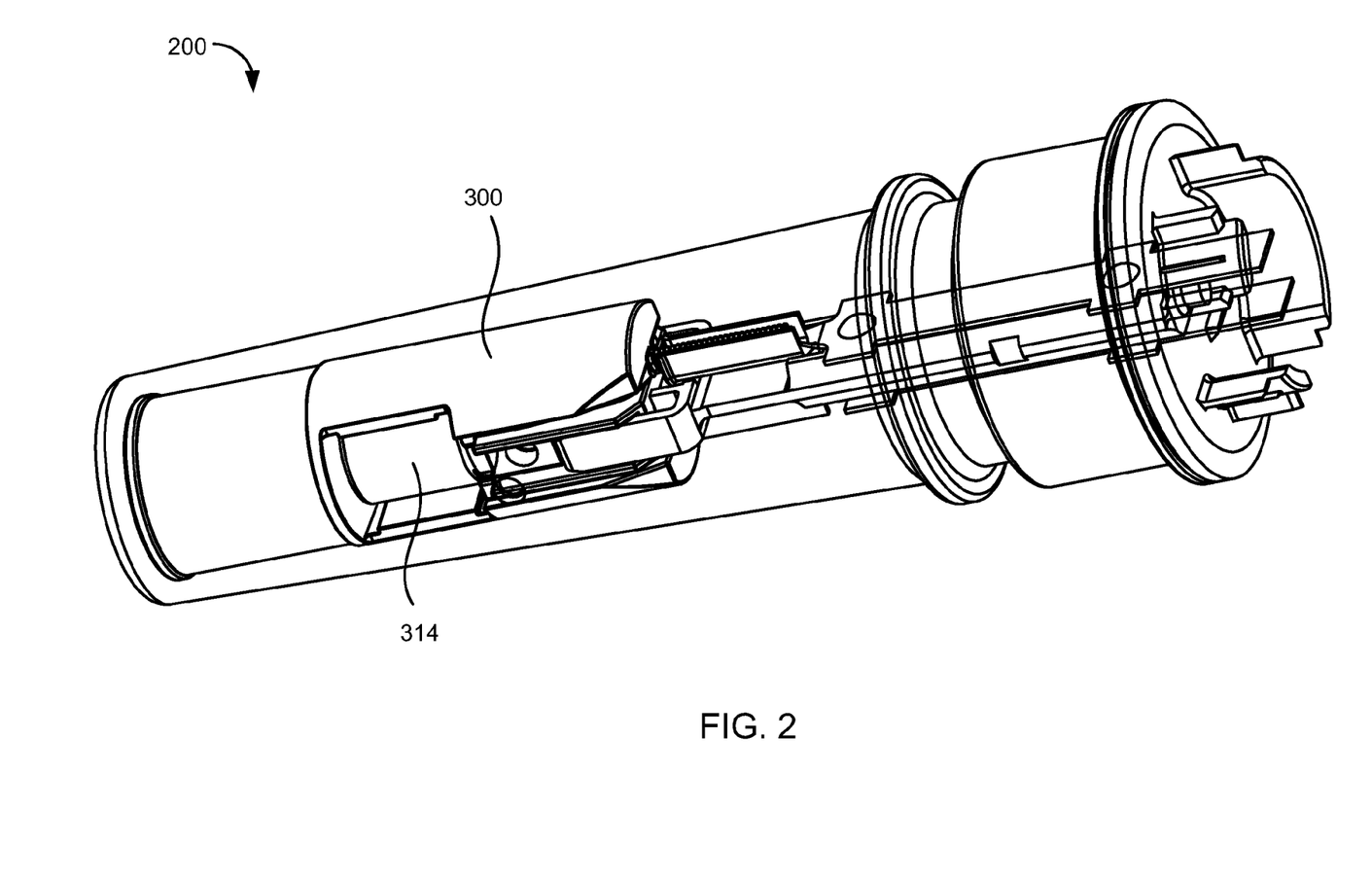
FIG. 2 illustrates a first view of an example embodiment of a first portion of the speed sensor.

FIG. 2 illustrates a first view of the first portion 200 of the speed sensor 100. Referring to FIG. 2, first portion 200 may include a sensing assembly 300. As will be described further below, sensing assembly 300 may include a bobbin, magnet 314, coil, and a lead frame. The sensing assembly 300 may sense a movement (e.g., rotation) of an object such as, for example, a turbine wheel and/or compressor wheel that may rotate in a turbocharger. The sensing assembly 300 may generate a signal (e.g., an electrical pulse) based on the sensed movement. The generated signal may be provided by the sensing assembly 300 to the second portion 500 of the speed sensor 100.

Figure 3:
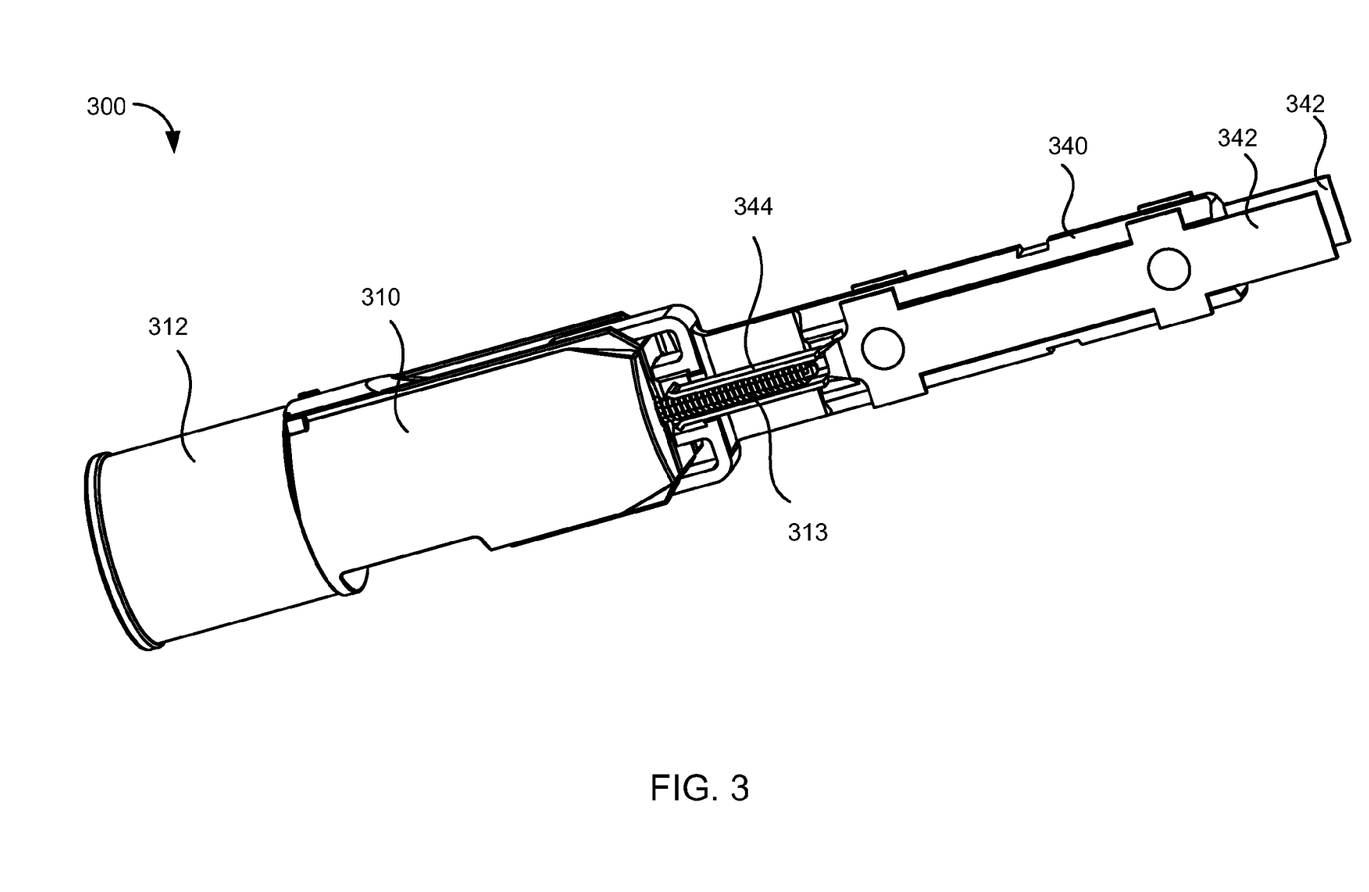
FIG. 3 illustrates an example embodiment of a sensing assembly that may be contained in the first portion.

FIG. 3 illustrates an example embodiment of a sensing assembly 300 that may be used with speed sensor 100. Referring now to FIGS. 2 and 3, sensing assembly 300 may include a bobbin 310, a coil 312, and a lead frame 340. The coil 312 may include wire (e.g., enameled copper wire) that may be wrapped around one end of the bobbin 310. The coil 312 may, for example, sense a movement of an object and generate a signal based on the sensed movement. Here, sensing may involve magnetics. For example, an electric current may be applied to the coil 312 to generate a magnetic field. The field may be disturbed by movement of the object such as, a turbine wheel. The signal generated by the coil 312 may be based on the disturbance to the field caused by the movement of the object.

Bobbin 310 may be molded from an electrically non-conductive material. Bobbin 310 may be staked with one or more electrically conductive pins 313. The coil 312 may be terminated at the pins 313. In an embodiment, the coil 312 contains two ends and the bobbin 310 is staked with two pins 313. Here, one end of the coil 312 is wrapped around one of the pins 313 and the other end of the coil 312 is wrapped around the other pin 313.

Magnet 314 (FIG. 2) may be affixed to bobbin 310. The magnet 314 may be used in conjunction with the coil 312 to generate the magnetic field. In an embodiment, the magnet 314 is a samarium-cobalt (SmCo) magnet such as, for example, a $Sm_2Co_{17}$ magnet. It should be noted, however, that in other embodiments other suitable types of magnets may be used.

A pin 313 may be placed inside an opening 344 in lead frame 340 and make electrical contact with the lead frame 340 at the opening 344 of the lead frame 340. Note that the opening 344 may enable inspection of the connection between the pin 313 and the lead frame 340. Moreover, it should be noted that one or more welding electrodes may be placed on one or more sides of opening 344 to weld the pin 313 to the lead frame 340.

Lead frame 340 may include one or more terminals 342. The terminals 342 may be electrically conductive. For example, in an embodiment, the terminals 342 are made of a metal that is electrically conductive. The metal may include, for example, nickel-plated brass. Note that in other embodiments, other electrically conductive materials may be used. As will be described further below, terminals 342 may transfer a signal generated by coil 312 to the second portion 500 of speed sensor 100.

Lead frame 340 may include provisions for mounting bobbin 310. For example, lead frame 340 may include engagement features (e.g., hooks) which may engage the bobbin 310 and hold the bobbin 310 in place. Here, for example, the lead frame 340 may act as a carrier for bobbin 310.

Figure 4:
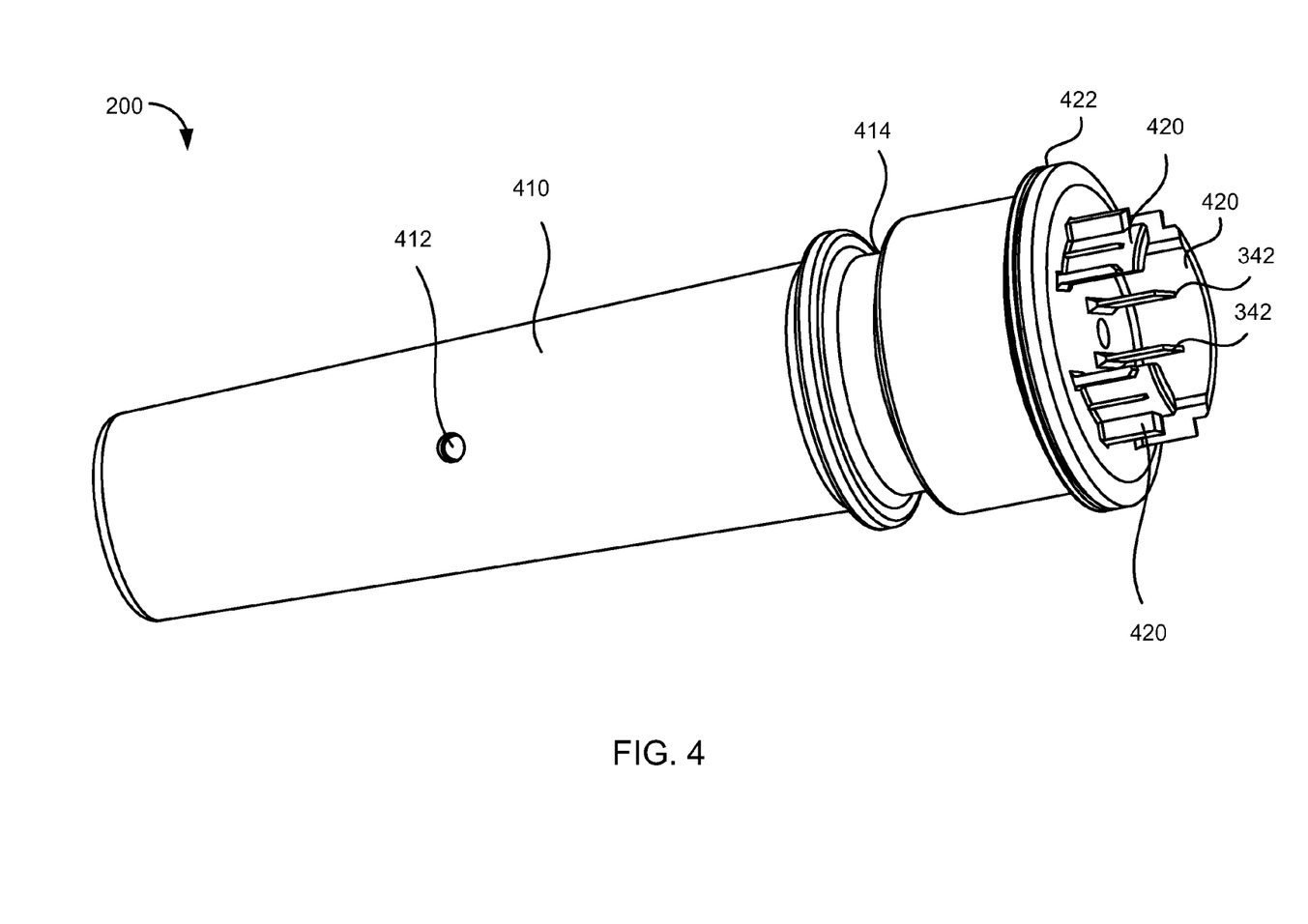
FIG. 4 illustrates a second view of the first portion.

FIG. 4 illustrates a second view of the first portion 200. Referring to FIG. 4, the first portion 200 may include a housing 410. The housing 410 may house the first portion 200. The housing 410 may be made of a liquid-crystal polymer (LCP), although, other materials may be used. The housing 410 may include hole 412, groove 414, ribs 422, and ridges 420. The housing 410 may be over-molded over sensing assembly 300 (FIG. 3) during the manufacture of the first portion 200.

Hole 412 may provide an opening through housing 410 to bobbin 310. A hole (not shown) corresponding to hole 412 may be located on housing 410 at a location that is opposite hole 412. In an embodiment, hole 412 and the corresponding hole are used to hold sensing assembly 300 in place while housing 410 is over-molded over sensing assembly 300.

Groove 414 may provide placement for an O-ring that may be used with speed sensor 100. The O-ring may provide, for example, a seal for the speed sensor 100 after the speed sensor 100 is placed in operation. Groove 414 may be shaped to accommodate the O-ring. The shape may include, for example, one or more tapered edges.

Ribs 422 accommodate joining (e.g., bonding) the first portion 200 and third portion 800 together. As will be described further below, in an embodiment, the first portion 200 and the second portion 500 are joined together. After the first portion 200 and the second portion 500 are joined, the third portion 800 is over-molded over the joined first 200 and second 500 portions. Here, the ribs 422 may melt during the over-molding of the third portion 800 over the joined first 200 and second 500 portions thereby accommodating joining the first portion 200 and the third portion 800 together.

Ridges 420 may protrude from housing 410. Ridges 420 may accommodate an alignment of the first portion 200 with the second portion 500 when the first 200 and second 500 portions are assembled together. For example, ridges 420 may be keyed to accommodate a specific alignment of the first portion 200 with the second portion 500 when the first 200 and second 500 portions are joined together.

Figure 5:
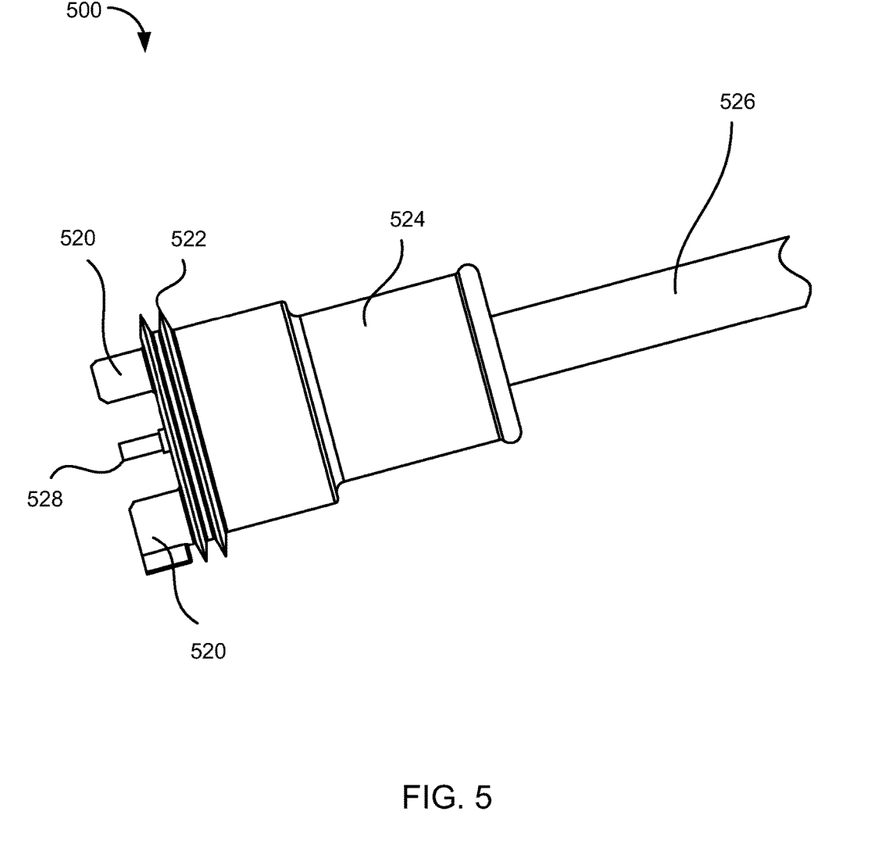
FIG. 5 illustrates an example embodiment of a second portion of the speed sensor.

FIG. 5 illustrates an example embodiment of the second portion 500 of speed sensor 100. Referring to FIG. 5, second portion 500 may include a housing 524 and a wiring harness 526. The housing 524 may be used to house the second portion 500. The housing 524 may be made of LCP, although, other materials may be used. The housing 524 may include ridges 520 and ribs 522.

The wiring harness 526 may provide a connection between the speed sensor 100 and an outside source (e.g., a computer). The connection may carry various signals between the speed sensor 100 and the outside source. These signals may include, for example, readings that may be provided by the speed sensor.

The wiring harness 526 may include a terminal 528 that may be used to electrically connect to the first portion 200 and enable electrical signals to be transferred between the first portion 200 and the second portion 500. Terminals 528 may be made of an electrically conductive material (e.g., copper). As will be described further below, wiring harness 526 may include electrically conductive wires which are terminated by terminals 528.

Ridges 520 may protrude from housing 524. Ridges 520 may accommodate an alignment of the second portion 500 with the first portion 200 when the first 200 and second 500 portions are assembled together. For example, ridges 520 may be keyed to accommodate a specific alignment of the second portion 500 with the first portion 200 when the first 200 and second 500 portions are joined together.

Ribs 522 accommodate joining the second portion 500 and third portion 800 together. As will be described further below, in an embodiment, the first portion 200 and the second portion 500 are joined (e.g., welded) together. After the first portion 200 and the second portion 500 are joined, the third portion 800 is over-molded over the joined first 200 and second 500 portions. Here, the ribs 522 may melt to accommodate joining the second portion 500 and the third portion 800 together.

Figure 6:
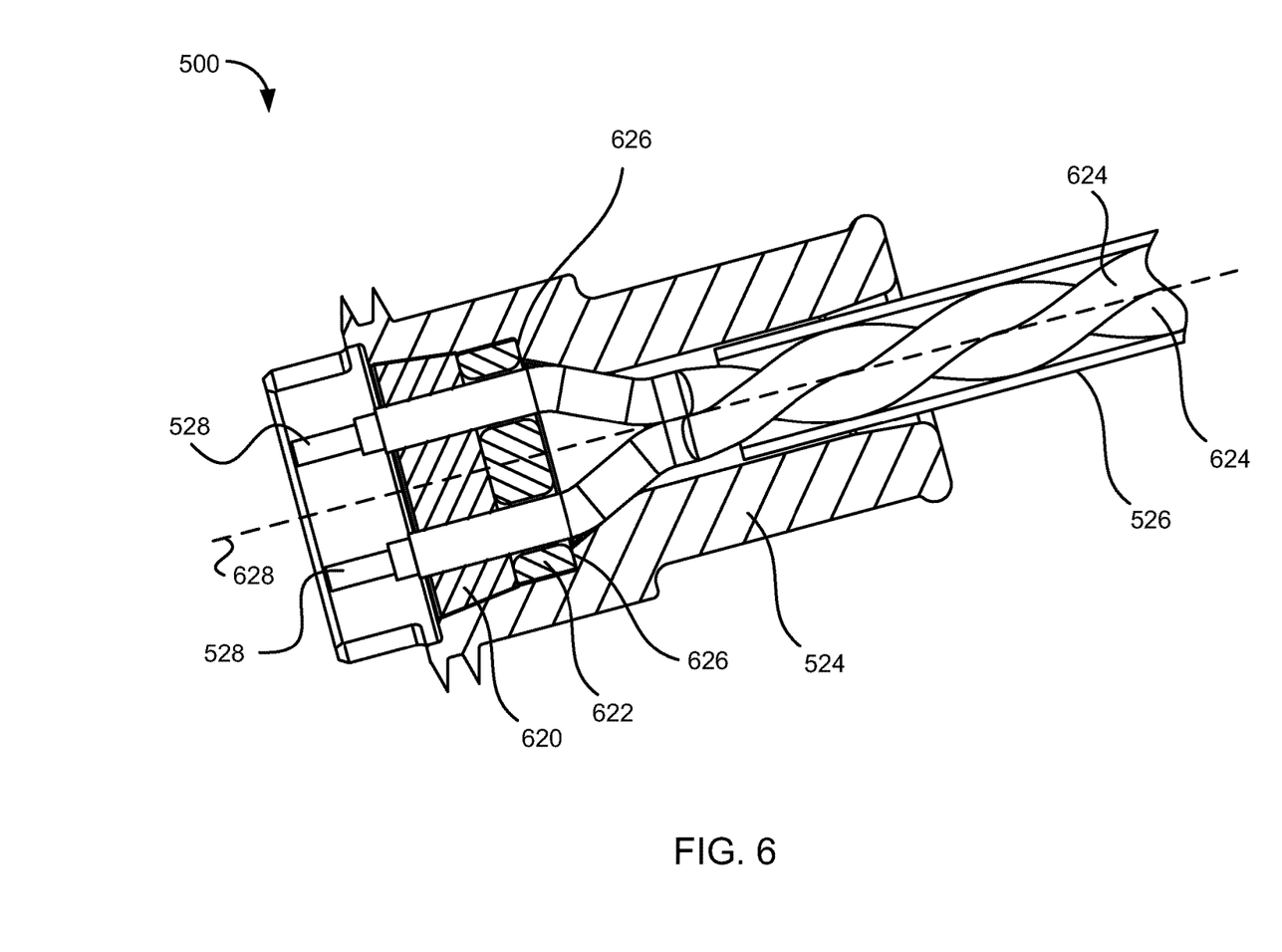
FIG. 6. illustrates a cut-away view of the second portion.

FIG. 6 illustrates a cutaway view of the second portion 500. Referring to FIG. 6, the second portion 500 may contain a seal 620, a washer 622, and wires 624. The seal 620 may be an environmental seal that act to prevent contaminants from entering the housing 524. The seal 620 tapered. Tapering the seal 620 may act to secure placement of the seal 620 in housing 524. The washer 622 may be a backing washer that may act to secure the wires 624 in the housing 524 and prevent the wires 624 from exiting the housing 524 after the housing 524 is, for example, over-molded onto the wiring harness 526.

The seal 620 and/or the washer 622 may be made of a pliable material. In an embodiment, seal 620 is made from an elastomer and washer 622 is made from a rigid polymer. Note that housing 524 may include one or more lips 626 which may further secure placement of the washer 622 and/or the seal 620 in housing 524.

Wires 624 may include an electrically conductive material (e.g., copper) that may be used to conduct electrical signals. Wires 624 may include insulation to prevent conduction of electrical signals between the wires 624. Moreover, wires 624 may be twisted to obviate coupling of stray signals to the wires 624. Wires 624 may be terminated with terminals 528.

Seal 620 and washer 622 may act to accommodate a positioning the wires 624 in the second portion 500. Specifically, seal 620 and washer 622 may include holes that may accommodate an alignment of the wires 624. Here, for example, the alignment may include a predefined spacing between the wires 624. Moreover, alignment may include an angular position of the wires 624 with respect to a longitudinal aspect of the second portion 500.

For example, the seal 620 and washer 622 may include holes that may enable the wires 624 to be aligned with respect to axis 628. Here, for example, axis 628 may be a longitudinal center axis for the second portion 500. The holes may provide for an alignment of wires 624 such that the wires 624 are equidistant from the axis 628 and parallel to the axis 628 within a predefined tolerance.

Figure 7:
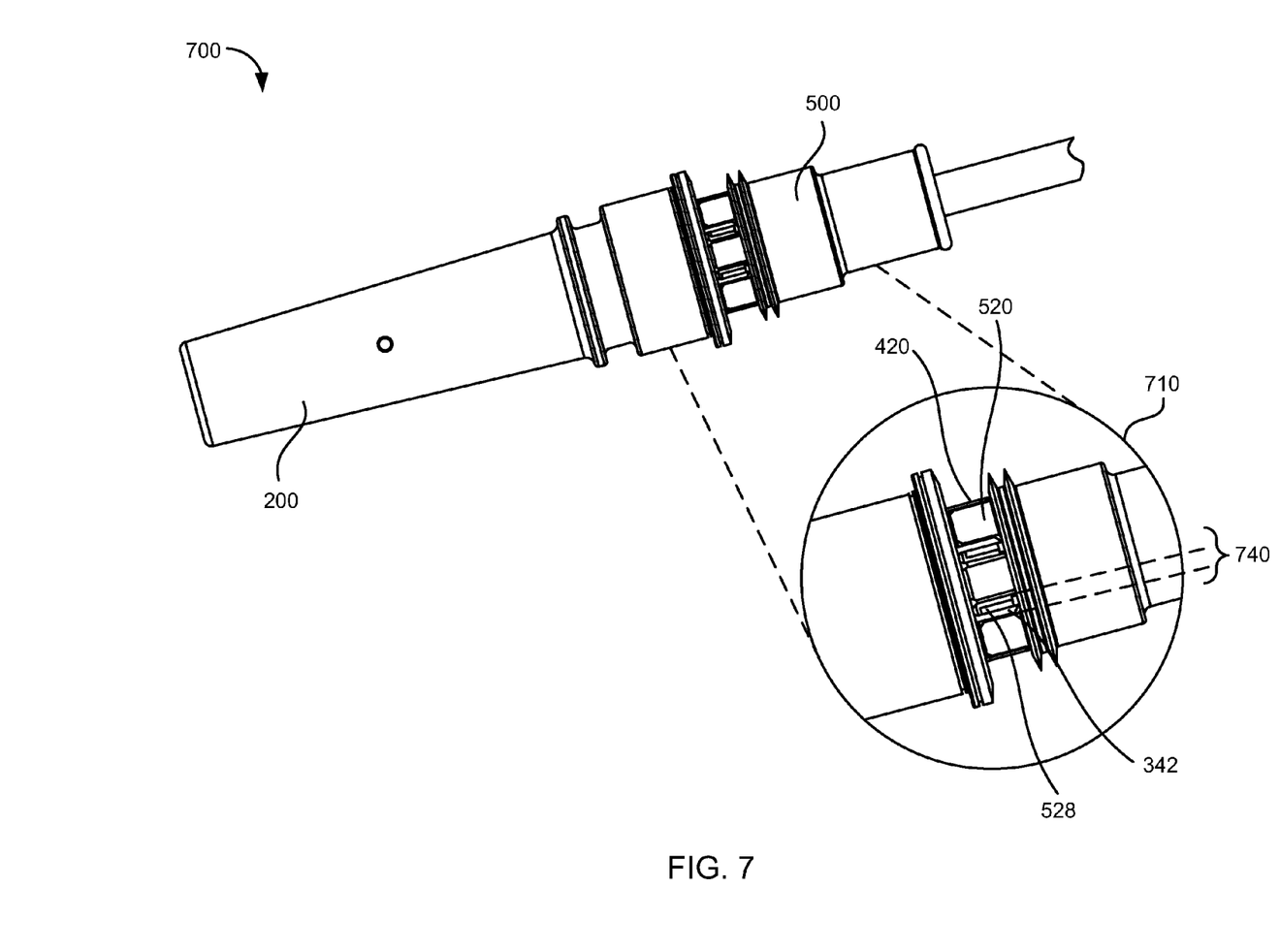
FIG. 7 illustrates a subassembly that includes a joined first portion and second portion.

FIG. 7 illustrates an example embodiment of a subassembly 700 that includes the first portion 200 and the second portion 500. Referring to FIG. 7, as noted above, ridges 420 and 520 may be keyed. The keying may accommodate an alignment of the first portion 200 and the second portion 500 when the first portion 200 and the second portion 500 are joined to form subassembly 700. For example, the keying may allow only one way for first portion 200 to be joined with the second portion 500.

Circle 710 illustrates the joining of first portion 200 and the second portion 500 in more detail. Referring to circle 710, ridges 420 and 520 may interlock. Interlocking ridges 420 and 520 may accommodate an alignment of the first portion 200 with the second portion 500. In addition, interlocking ridges 420 and 520 may cause one or more windows 740 to be formed. The windows 740 may expose terminals 342 and terminals 528. The windows 740 may be used to accommodate a joining terminals 342 and terminals 528 together.

Joining terminals 342 and terminals 528 together may electrically and/or mechanically connect the first portion 200 with the second portion 500. For example, in an embodiment, a welding probe enters window 740 to electrically and mechanically join terminals 342 and to terminals 528 using a welding technique. It should be noted that other techniques may be used to electrically and/or mechanically join terminals 342 and terminals 528 together. For example, in an embodiment, a soldering probe enters window 740 to electrically and mechanically join terminals 342 to terminals 528 using a soldering technique.

Figure 8:
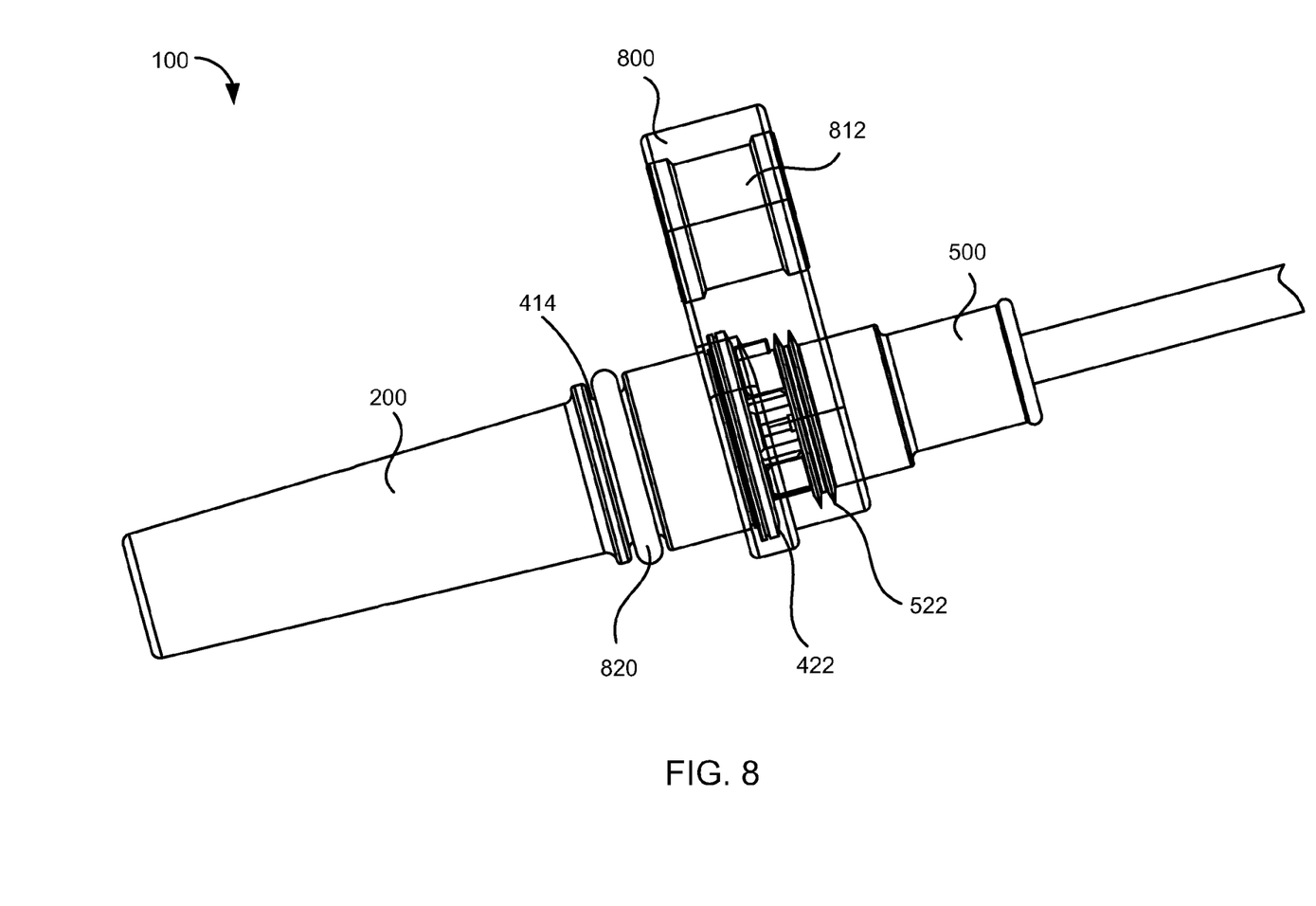
FIG. 8 illustrates an example embodiment of a third portion of the speed sensor over-molded over the joined first portion and second portion.

FIG. 8 illustrates an example embodiment of a third portion 800 of the speed sensor 100 joined to subassembly 700. Referring to FIG. 7, the third portion may be a flange that may be associated with the speed sensor 100. The flange may be used to mount the speed sensor 100 during an operation of the speed sensor 100. The flange may include a hole 812 that may be used to accommodate mounting the speed sensor 100.

The third portion 800 may be joined to subassembly 700 by over-molding the third point 800 over the subassembly 700. The over-molding may occur at ribs 422 and 522. The over-molded third portion 800 may cover the subassembly 700 at a point in the subassembly 700 where the first portion 200 and second portion 500 are joined. Moreover, over-molding the third portion 800 at this point of the subassembly 700 may environmentally seal this point from contaminants that may otherwise enter this point.

For example, in an embodiment, over-molding the third portion 800 on the subassembly 700 causes a portion of the third portion 800 to flow into windows 740 and form a seal to seal the joining of the first portion 200 and the second portion 500. Moreover, this flow may act to drive out air that may be contained at the point in the subassembly 700 where the first portion 200 and the second portion 500 are joined. Forcing the air out may prevent undesirable conditions that may occur if the air were present (e.g., oxidation of the terminals 342 and terminals 528). In addition, forcing the air out may improve a durability of the speed sensor 100 at the point where the first portion 200 and the second portion 500 are joined.

Also illustrated in FIG. 8 is a placement is a seal 820. In an embodiment, seal 820 is an O-ring that is made of a pliable material. As shown in FIG. 8, the seal 820 may be placed in groove 414. Seal 820 may be used to prevent contaminants from migrating beyond groove 414 towards the second portion 500 during an operation of the speed sensor 100.

Figure 9:
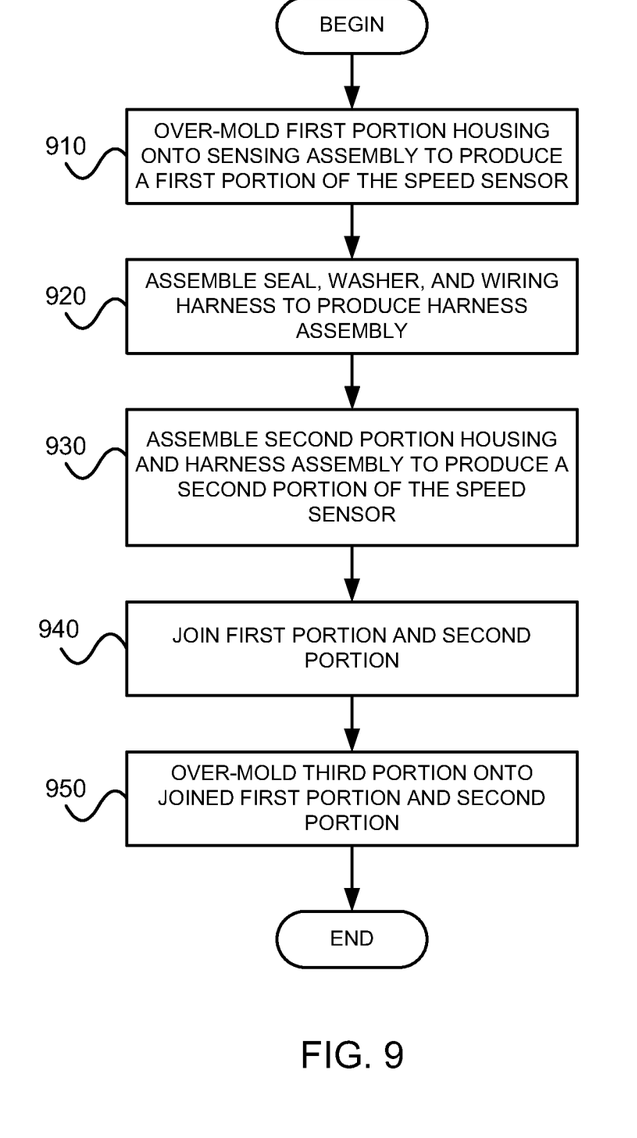
FIG. 9 is a flow chart of example acts that may be performed to produce a speed sensor.

FIG. 9 illustrates a flow chart of example acts that may be performed to produce a speed sensor. Referring to FIG. 9, at block 910 a housing for the first portion is over-molded onto a sensing assembly to produce a first portion of the speed sensor. The sensing assembly may be an assembly that senses a movement of an object and generate a signal based on the sensed movement. The signal may be present on terminals associated with the sensing assembly. Over-molding the housing may encase the sensing assembly except for the terminals. The housing may act to protect certain portions of the sensing assembly from contamination and damage that may occur if the housing were not present.

At block 920, a seal, washer, and wiring harness is assembled to produce a harness assembly. The wiring harness may contain a plurality of wires. The seal and washer may include holes through which wires contained in the wiring harness may pass. The holes may be used to accommodate an alignment of the wires.

At block 930, the harness assembly and a housing for the second portion are assembled to produce a second portion of the speed sensor. The housing may secure the wiring harness assembly and enable the wiring harness to be handled with ease. Moreover, the housing may protect portions of the wiring assembly from various environmental conditions.

At block 940, the first portion and the second portion are joined. For example, the first portion and the second portion may be keyed. The keying may accommodate an alignment of the first and second portions when joining the first and second portions. Moreover, the first and second portions may include terminals that may be used to make an electrical connection between the first and second portions. The terminals on the first portion may be joined with terminals on the second portion to make the electrical connection. The terminals may be joined by welding, soldering, and/or otherwise joining the terminals together.

At block 950, a third portion of the speed sensor is over-molded onto the joined first portion and second portion. The third portion may be over-molded at a point where the first and second portion are joined. Over-molding the third portion at the point may provide a seal that may seal the point from outside contaminants. Moreover, over-molding the third portion at the point may strengthen the speed sensor at the point.

The foregoing description of embodiments is intended to provide illustration and description, but is not intended to be exhaustive or to limit the invention to the precise form disclosed. Modifications and variations are possible in light of the above teachings or may be acquired from practice of the invention.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. A speed sensor comprising:
a sensing assembly including: a bobbin having a wire coil and a magnet for generating a magnetic field and a plurality of conductive pins in electrical connection with the wire coil; and a lead frame affixed to the bobbin, the lead frame providing an electrical connection between the conductive pins and a plurality of first conductive terminals;
a first housing over-molded to the sensing assembly, the first housing having an upper flange proximate to an open top end, wherein the first conductive terminals protrude from the open top end;
a second housing having a lower flange proximate to an open lower end, the lower flange joined to the upper flange of the first housing to form a plurality of weld windows, wherein the second housing contains a plurality of second conductive terminals proximate to both the open lower end and the first conductive terminals such that the weld windows provide an opening to allow the first conductive terminals to be welded to the second conductive terminals; and
a flange overmold having a first opening operable to join the flange overmold to both the upper flange and the lower flange to seal the first housing to the second housing and fill the weld windows.

2. The speed sensor of claim 1 wherein the flange overmold includes a second opening offset from the first opening, the second opening operable to mount the flange overmold.

3. The speed sensor of claim 1 wherein the second housing includes a plurality of ridges proximate to the open lower end, the ridges aligning the first housing and the second housing.

4. The speed sensor of claim 1 wherein the bobbin includes a plurality of stake pins extending perpendicular to the conductive pins, the stake pins staking the conductive pins within the bobbin.

5. The speed sensor of claim 1 wherein the magnet is disposed within an annular ring formed by the wire coil.

6. The speed sensor of claim 5 wherein the magnet protrudes substantially from a top opening of the annular ring and slightly from a bottom opening of the annular ring.

7. The speed sensor of claim 6 wherein the first housing is thicker at a location proximate to the bottom opening of the annular ring.

8. The speed sensor of claim 1 wherein the flange overmold is further operable to seal the weld windows such that the flange overmold flows into the weld windows driving out air.

9. The speed sensor of claim 1 wherein:
the first housing includes a plurality of first ribs proximate to the open top end;
the second housing includes a plurality of second ribs proximate to the open lower end; and
the first opening of the flange overmold is operable to couple with the first ribs and the second ribs.

10. A speed sensor comprising:
a sensing assembly extending substantially along a longitudinal axis for generating a signal associated with a movement of an object external to the speed sensor, the sensing assembly having a plurality of conductive terminals proximate to an upper end for transmitting the signal;
a first housing extending along the longitudinal axis and over-molded to the sensing assembly, the first housing having an upper flange proximate to a top end, wherein the first conductive terminals protrude from the top end;
a second housing extending along the longitudinal axis and having a lower flange proximate to a lower end, the lower flange joined to the upper flange of the first housing to form a plurality of weld windows, wherein the second housing contains a plurality of second conductive terminal proximate to the lower end and the first conductive terminals such that the weld windows provide an opening to allow the first conductive terminals to be welded to the second conductive terminals;

a flange overmold extending along a transverse axis and having: a first opening operable to join the overmold to both the upper flange and the lower flange to seal the first housing to the second housing and seal the weld windows; and a second opening, offset from the first opening along the transverse axis, for mounting the flange overmold.

\* \* \* \* \*